(12) United States Patent
Nikkel (10) Patent No.: US 7,155,953 B1
(45) Date of Patent: Jan. 2, 2007

(54) ANVIL DRIVING ASSEMBLY

(76) Inventor: Robert E. Nikkel, 4101 Mt. Vernon Ct., Fort Collins, CO (US) 80525-3335

( * ) Notice: Subject to any disclaimer, the term of this patent is extended or adjusted under 35 U.S.C. 154(b) by 413 days.

(21) Appl. No.: 10/848,885

(22) Filed: May 19, 2004

(51) Int. Cl.
*B21L 15/04* (2006.01)
*B21J 15/26* (2006.01)

(52) U.S. Cl. .................................. 72/391.8; 29/243.526
(58) Field of Classification Search .............. 72/391.4, 72/391.8; 29/243.526
See application file for complete search history.

(56) References Cited

U.S. PATENT DOCUMENTS

| | | | |
|---|---|---|---|
| 4,186,787 A | 2/1980 | Husain | |
| 4,402,203 A * | 9/1983 | Molina | ........................ 72/114 |
| 4,425,782 A | 1/1984 | Todisco | |
| 4,462,240 A | 7/1984 | Yamamoto | |
| 4,557,650 A | 12/1985 | Molina | |
| 4,732,518 A | 3/1988 | Toosky | |
| 5,040,277 A | 8/1991 | Dessouky | |
| 5,079,818 A * | 1/1992 | Schwab | .................. 29/243.527 |
| 5,405,228 A | 4/1995 | Reid et al. | |
| 5,605,070 A * | 2/1997 | Wille | .......................... 72/391.4 |
| 5,771,738 A * | 6/1998 | Ko | ............................ 72/391.8 |
| 6,205,640 B1 | 3/2001 | Dubugnon | |

OTHER PUBLICATIONS

Parts & Accessories Manual TA7533 Hand Installation Tool, Huck Fastners, an Alcoa Business, HK999, Rev. 05-99, see especially p. 8.

* cited by examiner

*Primary Examiner*—David Jones
(74) *Attorney, Agent, or Firm*—Marian J. Furst, Attorney at Law; Marian J. Furst (57) ABSTRACT

An anvil driving assembly, anvil driving tool, and method for installing rivetless floating nut plates in workpieces. The tool and method are capable of pulling a rivetless nut plate sleeve into a countersunk hole in the workpiece simultaneously with flaring the open end of the nut plate sleeve.

17 Claims, 10 Drawing Sheets

PRIOR ART

ANVIL DRIVING ASSEMBLY

FIELD OF THE INVENTION

The present invention relates to an apparatus and method for installing fasteners in a work piece, and more particularly, for installing rivetless floating nut plates in a work piece.

BACKGROUND OF THE INVENTION

Rivetless floating nut plates, are used in manufacturing applications where it is desirable to retain a nut on one side of a work piece in proximity to a countersunk hole through the work piece, so that a screw or other fastener can subsequently be installed from the countersunk side of the work piece to engage the nut. One use of rivetless nut plates is in constructing airplanes, such as the F-16 fighter plane. The rivetless nut plate commonly used in such aircraft applications is described in U.S. Pat. No. 4,732,518. Rivetless nut plates include a sleeve with a basket attached to one end, and an internally threaded nut is retained within the basket. A portion of the sleeve exterior, ajdacent the basket, is knurled. The knurled portion of the sleeve has an outer diameter sized for a friction fit inside a hole through the work piece and functions to prevent rotation of the nut plate assembly relative to the work piece once the assembly is installed. The sleeve length generally matches the thickness of the work piece, so that the smooth sleeve extends through the counter sunk hole but does not protrude beyond the work piece. When installed properly, the knurled portion of the sleeve is lodged inside the hole in the work piece, and the smooth end of the sleeve is flared to fit against the countersink of the hole.

Rivetless floating nut plates are usually attached to work pieces using a slow, cumbersome, two-step procedure. After the nut is screwed onto a mandrel, the nut plate assembly is pulled through the hole in the work piece until the knurled portion at the end of the sleeve engages the work piece inside the hole. Then, in a second step, the distal end of the sleeve is flared to fit tightly against the countersunk portion of the hole in the work piece. Several problems can arise during installation by this method. The sleeve may not be centered precisely within the hole in the work piece, resulting in an asymmetrical flaring of the distal end of the sleeve and poor retention of the sleeve within the hole in the work piece. With commonly used installation tools, such as a hand tool model no. TA7533, manufactured by Huck International, Inc., 3969 Paramount Boulevard, Lakewood, Calif. 90712, installation of rivetless nut plates is relatively slow, with as much as five to ten minutes required for an experienced technician to install each nut plate after the work piece is prepared to receive the fastener. This is due to the two-step procedure, where adjustment of the tool with respect to the tool's mandrel and the fastener sleeve length is very critical. If the installer selects the wrong relationship between the sleeve length and the mandrel, the fastener will not be properly installed and will need to be removed and replaced. If, for any reason, the mandrel and the sleeve are not centered properly in the hole, the knurled end of the sleeve may engage the wall of the hole in a way that the sleeve is not centered in the hole, which also results in a poor installation that may require removal and replacement of the fastener.

SUMMARY OF THE INVENTION

In accordance with the purpose of the present invention broadly described herein, one embodiment of the present invention comprises a driving anvil assembly for installing rivetless floating nut plates. The anvil assembly includes a driving anvil having an internally threaded base portion and an annular tapering driving portion. The driving portion includes a beveled positioning portion and a beveled sleeve-flaring driving portion separated by a stepped shoulder portion. A longitudinal hole, sized to accommodate a mandrel, extends through the driving portion. The assembly also includes an anvil base which has a first end adapted to be secured to an anvil driving tool and an externally threaded second end that is engageable with the internally threaded base portion of the driving anvil. The anvil base also has a longitudinal hole, sized to accommodate the mandrel, extending therethrough. The externally threaded second end of the anvil base is longer than the internally threaded base portion of the driving anvil.

In the driving anvil assembly, the beveled positioning portion of the driving anvil may be shaped to fit precisely and self-center into a predetermined countersink of a hole in a work piece, and the stepped shoulder portion may be positioned between the beveled positioning and beveled sleeve-flaring portions for engagement with an end of a sleeve of a rivetless floating nut plate. In this case, the sleeve has a pre-determined inner diameter, and the sleeve is centered about a central longitudinal axis of the driving anvil. Also, the anvil driving assembly may further comprise an internally threaded lock nut engaged with the externally threaded end of the anvil base, in which case the threaded end of the anvil base is preferably longer than the combined lengths of the internally threaded portion of the driving anvil and the lock nut. At least one of the lock nut and the base portion may comprise a knurled exterior surface, and if both have knurled surfaces, they may have different knurl patterns that are distinguishable by touch. Preferably, the first end of the anvil base is adapted for a friction fit or a threaded fit within an opening in an anvil driving tool.

Another embodiment of the present invention comprises a tool for installing rivetless nut plates. The tool includes a nose tube and turn nut adapted to receive an anvil base, a mandrel fixedly attached to and extending outward from the tool, and a driving anvil assembly including an anvil base adapted for reception and retention within the nose tube and turn nut. The driving anvil assembly may comprise a driving anvil having an internally threaded base portion and an annular tapering driving portion, wherein the driving portion includes a beveled positioning portion and a beveled sleeve-flaring driving portion separated by a stepped shoulder portion. The driving anvil also includes a longitudinal hole extending therethrough that is sized to accommodate a mandrel. In addition, the tool may comprise an anvil base having a first end adapted to be secured to an anvil driving tool an an externally threaded second end engageable with the internally threaded base portion of the driving anvil. The anvil base also includes a longitudinal hole therethrough sized to accommodate the mandrel, and the externally threaded second end of the anvil base is longer than the internally threaded base portion of the driving anvil. Preferably, the tool also comprises an internally threaded lock nut engageable with the externally threaded end of the anvil base between first end and the driving anvil, with the threaded end of the anvil base being longer than the combined lengths of the internally threaded portion of the driving anvil and the lock nut. The tool may be hand-held, and it may comprise a hydraulic system for pulling the mandrel and pushing the driving anvil assembly. In addition, the tool may also comprise a pneumatic system for rotating the mandrel and a hydraulic system for pulling the mandrel and pushing the driving anvil assembly.

Yet another embodiment of the present invention comprises a driving anvil for installing rivetless floating nut plates. The anvil includes an internally threaded base portion and an annular tapering driving portion. The driving portion includes a beveled positioning portion, a beveled sleeve-flaring driving portion, and a stepped shoulder portion separating the positioning and sleeve-flaring portions. The driving anvil also includes a longitudinal hole extending therethrough that is sized to accommodate a mandrel.

A further embodiment of the present invention comprises a method for installing rivetless floating nut plates into a work piece. The method comprising the steps of (a) providing a work piece comprising a first side and a second side and having a hole therethrough with a beveled countersink on the first side of the work piece; (b) inserting a sleeve of a rivetless floating nut plate through the hole from the second side of the work piece so that a basket, a nut, and a splined end of the sleeve are located on the second side of the work piece and an open end of the nut plate sleeve is located near the first side of the work piece; (c) inserting a mandrel through the sleeve from countersunk side of work piece and engaging an externally threaded end of the mandrel with the internally threaded nut of the nut plate; (d) moving an anvil centered on the mandrel on the first side of the work piece along the mandrel toward the work piece until a beveled portion of the anvil, concentric with the mandrel, makes contact with the beveled countersink of the hole in the work piece and an annular flaring portion of the anvil makes contact with the open end of the nut plate sleeve, thereby centering the beveled end of the anvil and the nut plate sleeve in the countersunk portion of the hole; and (e) driving the beveled end of the anvil into the hole while simultaneously pulling the mandrel in the opposite direction, thereby substantially simultaneously seating the splined end of the nut plate sleeve in the hole and flaring the open end of the sleeve against the beveled countersink of the hole. In addition, the method may comprise the step of releasing pressure on the anvil and disengaging the mandrel from the nut plate. Preferably, the method further comprises the step of positioning a lock nut against a non-beveled portion of the anvil to maintain position of anvil. Also preferably, the anvil includes an internally threaded portion engaged with an externally threaded anvil base, and step (d) comprises moving the anvil along the anvil base by rotating it for travel along the threaded base. The rivetless floating nut plate may have has a sleeve length selected to match the thickness of the work piece and an outer diameter selected to match the diameter of the hole through the work piece.

BRIEF DESCRIPTION OF THE DRAWINGS

These and other features, aspects, and advantages of the present invention will become better understood with reference to the following description, appended claims, and accompanying drawings, where:

FIG. 1 shows a prior art rivetless nut plate, with an isometric view in FIG. 1a and a side view in FIG. 1b;

DESCRIPTION OF THE INVENTION

The present invention comprises an apparatus and method for installing a rivetless floating nut plate into a work piece. The apparatus includes features for centering a nut plate sleeve within a countersunk hole in the work piece and for simultaneously pulling the sleeve into the hole and flaring the end of the sleeve against the countersink for a reliable and long-lasting installation. Thus, the method of the present invention facilitates faster and better installation of rivetless floating nut plates than has previously been possible.

Figure 1A:
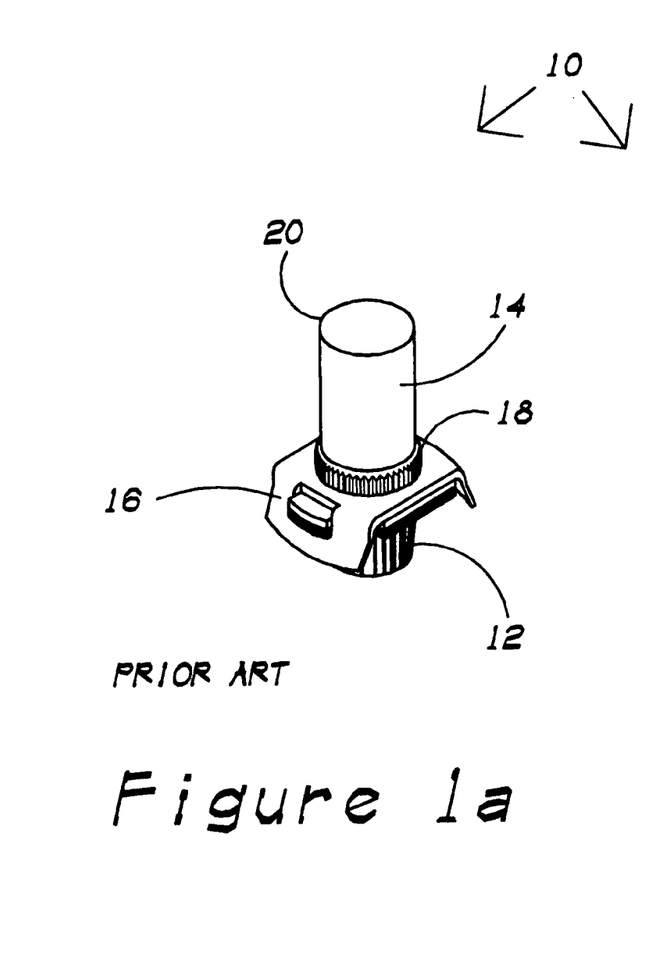
Figure 1B:
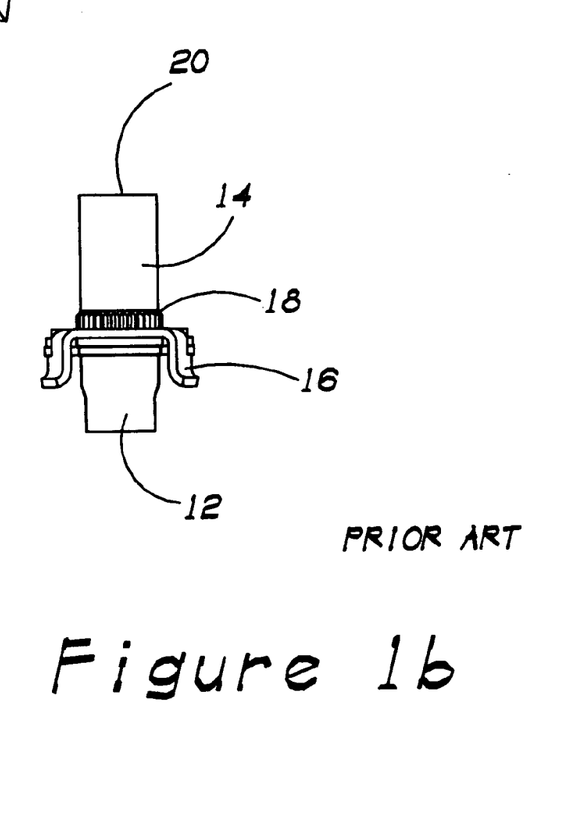
Figure 2:
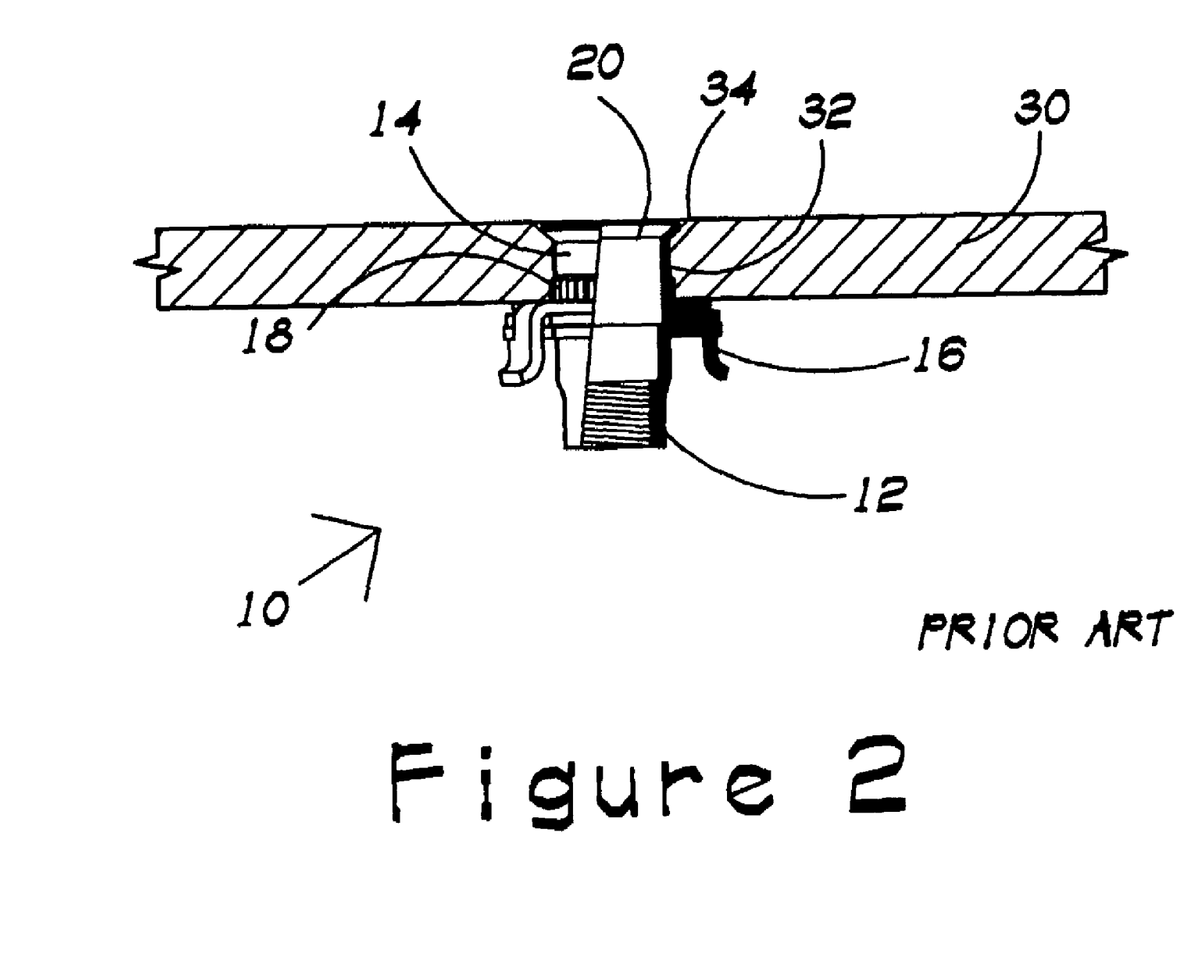
FIG. 2 is a cross section showing the prior art rivetless nut plate of FIG. 1 installed in a work piece.

It is contemplated that the present invention can be used with rivetless floating nut plates such as the ones commonly used in the aerospace industry. FIG. 1 shows such a rivetless nut plate 10, which has a three-piece construction, with a nut 12, a sleeve 14, and a basket 16 that retains the nut 12 adjacent one end of the sleeve 14. The end of sleeve 14 adjacent the basket and nut has protruding splines 18, and the other end 20 of sleeve 14 is open and has a smooth exterior surface. In a typical rivetless nut plate, the nut is made of 1050 carbon steel or A-286 alloy, the sleeve is made of 300 Series CRES steel which is cadmium plated or passivated, and the basket is made of carbon steel, such as cadmium plated or passivated 17-7Ph CRES steel or A-286 CRES steel that has been heat treated to spring temper. FIG. 2 shows rivetless nut plate 10 installed in a work piece 30. The tool of the present invention is capable of producing sufficient pull force to fully seat the splines 18 inside a hole 32 in work piece 30 while simultaneously flaring the open end 20 of the sleeve 14 against a beveled portion 34 of hole 32 to fully captivate the nut plate 10 in the work piece 30. It is contemplated that rivetless nut plates installed in accordance with the present invention will meet or exceed existing performance requirements for military applications, such as the push-out, torque-out, and tensile requirements of the United States military specification MIL-N-25027.

Figure 3:
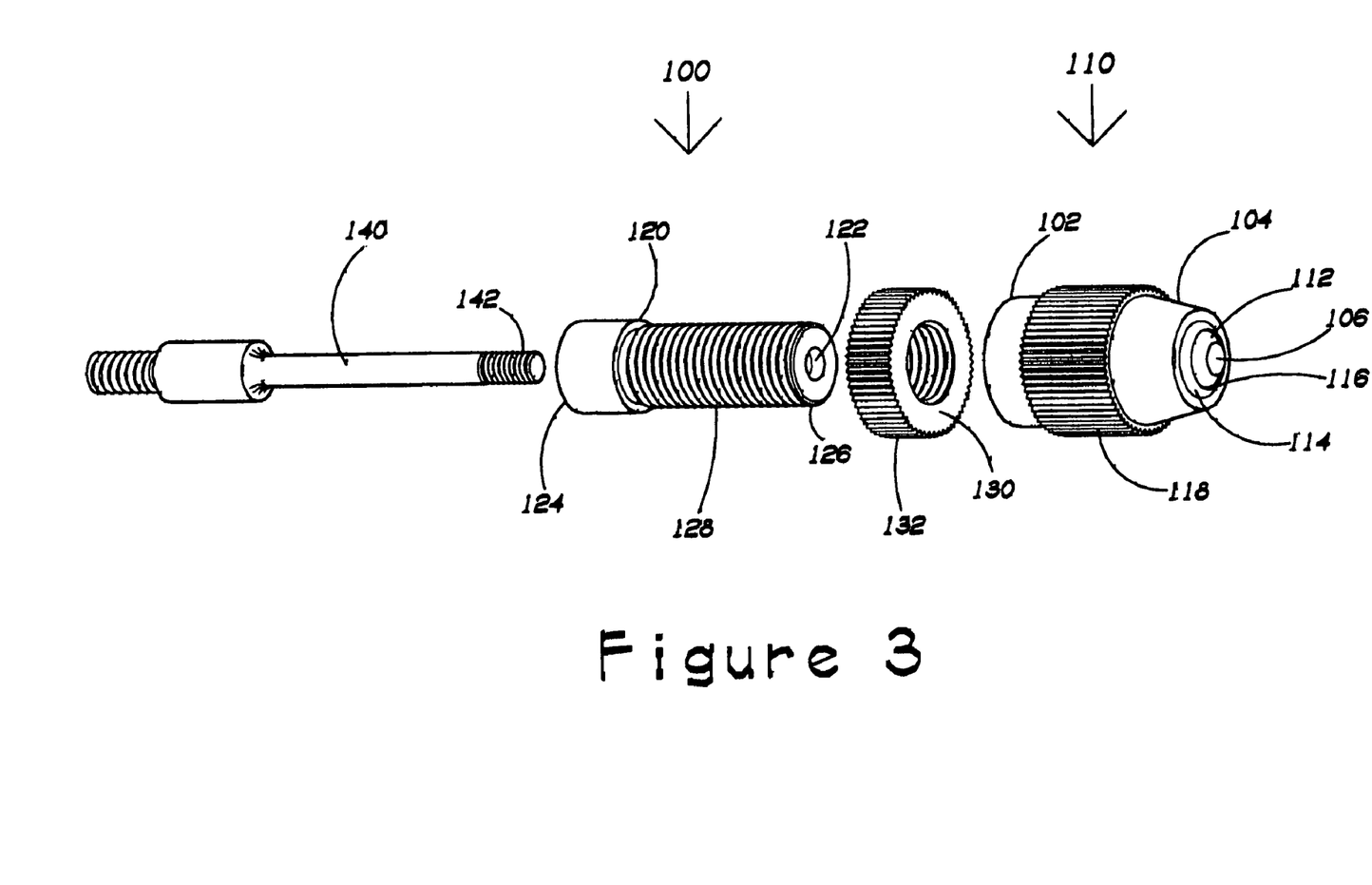
FIG. 3 is an exploded perspective view of a driving anvil assembly in accordance with the present invention.
Figure 4:
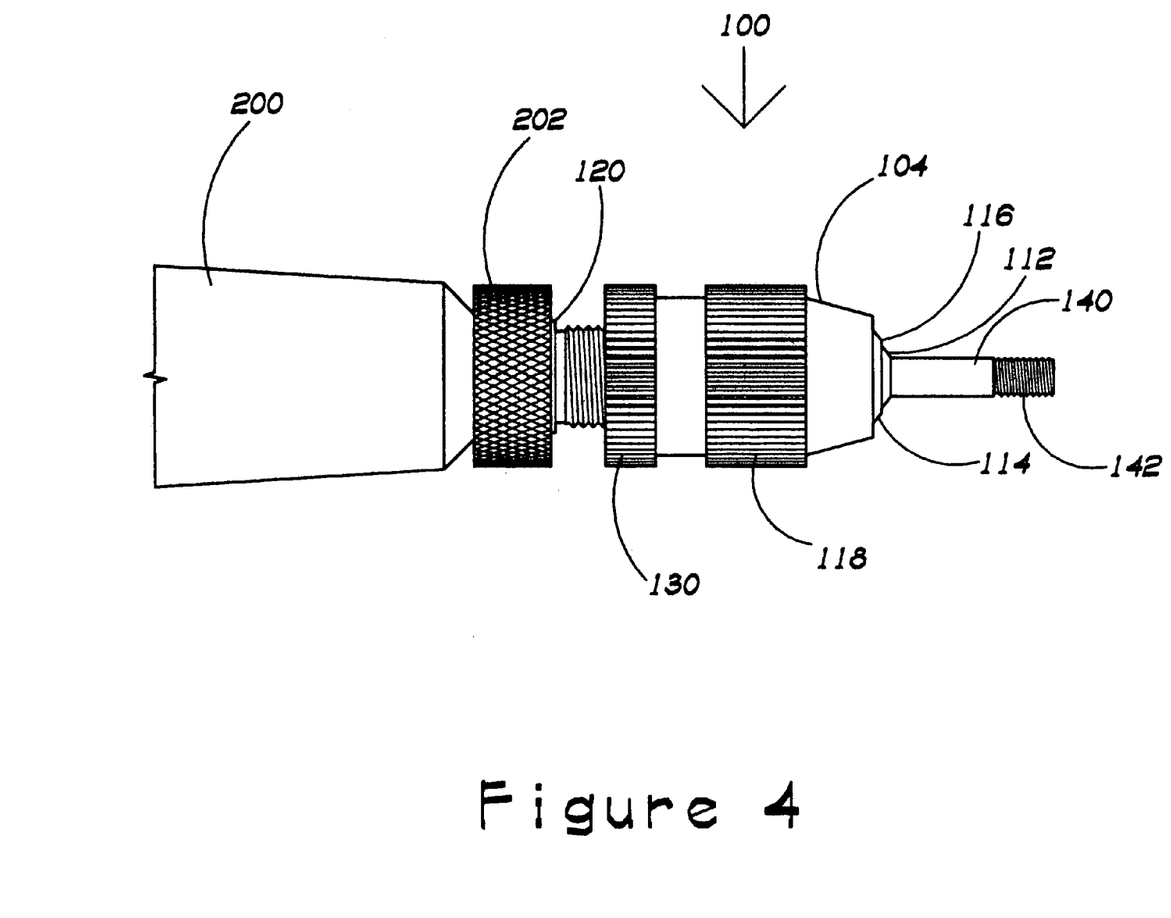
FIG. 4 shows the assembled parts of the driving anvil assembly of FIG. 3.

A driving anvil assembly 100 in accordance with the present invention is shown in FIGS. 3 and 4. Driving anvil 110 comprises an internally threaded base portion 102 and an annular driving portion 104. A mandrel hole 106 extends through the entire driving anvil 110 along a central longitudinal axis, with screw threads (not shown) inside base 102 and with a sufficient diameter over its entire length that a mandrel can pass through it easily and without binding. Preferably, base portion 102 has a knurled exterior surface 118. Driving portion 104 is annular about hole 106 and has a beveled positioning portion 114 and a beveled sleeve-flaring portion 112 separated by a stepped shoulder 116. Preferably, positioning and sleeve-flaring portions, 114 and 112, are beveled at the same angle as a predetermined countersink bevel in the work piece into which the rivetless nut plate is to be installed. Positioning portion 114 is sized so that when it contacts the countersink in the work piece, it automatically centers itself within the countersink so that the mandrel hole 106 through the driving anvil is concentric with the countersink in the work piece. Stepped shoulder 116 is positioned and sized such that a nut plate sleeve of a predetermined inner diameter can be butted against shoulder 116 and thereby centered within the hole in the work piece at the same time that the knurled portion of the sleeve is fully engaged with the interior surface of the hole in the work piece. Preferably, flaring portion 112 extends radially outward for a distance sufficient to contact the open end 120 of the nut plate sleeve and center the sleeve about the longitudinal axis of driving anvil 110 and mandrel 140, yet not so far that the end of the sleeve can't be contained between sleeve-flaring portion 112 and countersunk hole 34. In this way, the concentricity of the sleeve 14, the workpiece hole 30, and the longitudinal axes of the mandrel 140 and the anvil assembly 100 can be maintained as forces are applied to the nut plate assembly during installation, and shoulder 116 provides a stop for the open end of the sleeve.

Anvil base 120 also has an axial longitudinal hole 122 with a diameter sufficient that a mandrel 140 can pass through it without binding. A first end 124 of anvil base 120 is adapted for engagement with an anvil driving tool. For example, as shown, it could have a smooth exterior surface that allows it to be held by friction inside a receptacle on a tool. Alternatively, it could be screwed into a receptacle on a tool. The second end 126 of anvil base 120 is externally threaded with screw threads 128, with a thread configuration that is engageable with the internal screw threads of the driving anvil 110. The threaded portion of anvil base 120 should be long enough to provide for adjustment of driving anvil 110 along the base 120 to accommodate the intended range of nut plate sleeve lengths to be installed with the tool.

A driving anvil assembly 100 in accordance with the present invention may also include a lock nut 130, in addition to driving anvil 110 and anvil base 120. Lock nut 130 is internally threaded and engageable with external screw threads 128 on anvil base 120 between the first end 124 of anvil base 120 and driving anvil 110. Preferably, both the base portion 102 of the driving anvil and the lock nut 130 have knurled exteriors 118 and 132, respectively. More preferably, the knurl patterns or knurl lengths of the pieces can be sufficiently different that they can easily be differentiated by fingertip touch.

An anvil driving assembly such as assembly 100 may be a part of or mounted on an anvil driving tool. Preferably, the tool can be positioned, held, and operated with one hand, freeing a user's second hand for other tasks, as described below. The tool can be a gun-shaped device, preferably including a hydraulic mechanism to facilitate application of the necessary forces for installing rivetless nut plates. One suitable gun-shaped device is a Model D-700A Hand Installation Tool, U.S. Pat. No. 5,425,164, available from Fastening Systems International, P.O. Box 1372, Sonoma, Calif. 95476.

Referring to FIGS. 4 and 5, an installation tool in accordance with the present invention may use hydraulic pressure or a combination of pneumatic and hydraulic pressure to move the anvil assembly along the mandrel shaft or to pull the mandrel within the anvil assembly to install a fastener. The tool may be a self-contained hand-held tool that is easily portable, or it may be a larger apparatus intended to be more permanently located in an assembly or maintenance shop. Thus, compressed air and oil for the hydraulic system may be supplied via hoses from air and oil reservoirs.

In one embodiment, the installation tool terminates in a nose tube 200 and includes a turn nut 202. Although the tool generally resembles a gun in shape, only the nose tube and turn nut are illustrated, and the nose is mounted to the tool along a shaft in a manner that allows the nose to telescope relative to the main portion of the gun. Turn nut 202 can slide freely lengthwise along the shaft, yet it also can engage the shaft such that rotating turn nut 202 will also rotate the shaft and attached mandrel 140. In addition, and turn nut 202 is adapted for engagement with an anvil base, such as anvil base 120. Preferably, turn nut 202 includes an O ring mounted inside an internal opening, and the anvil base 120 fits into the opening and can be retained there by friction. Preferably, mandrel 140 is permanently attached to the tool, and the tool is dedicated to use with a predetermined length range of nut plate sleeves, with a predetermined inner thread configuration on the nuts. Thus, end 142 of mandrel 140 is threaded for engagement with nuts having a predetermined internal thread configuration. Alternatively, a mandrel could be attached to an installation tool in a less permanent manner known in the art for interchangeable use with other mandrels for use with different sized rivetless nut plates.

Figure 5A:
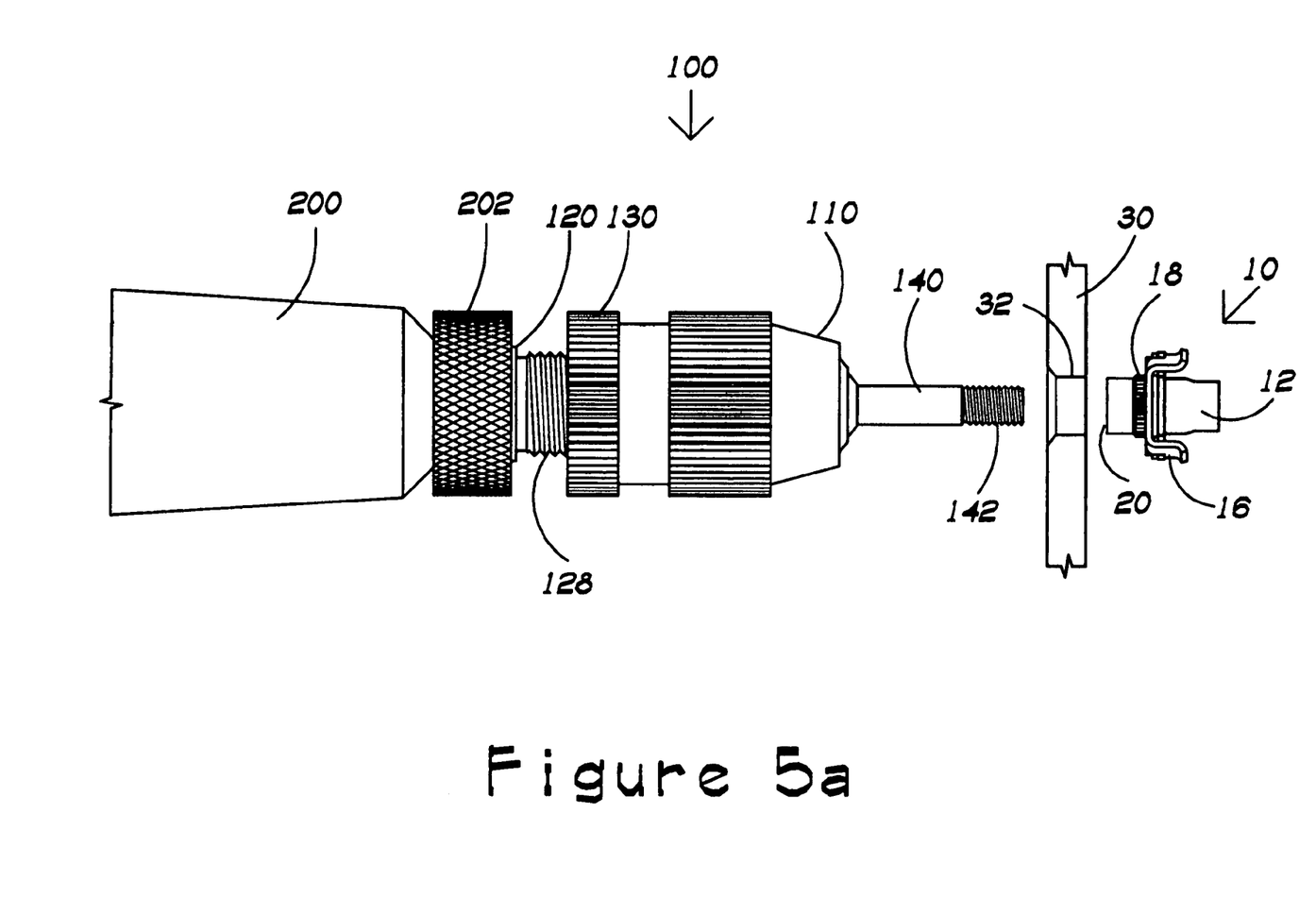
FIGS. 5a–e show the steps for installation of a rivetless nut plate using an installation tool and anvil driving assembly in accordance with the present invention.

A tool equipped with anvil assembly 100 can be used to install rivetless nut plates, such as nut plate 10, into work pieces, such as work piece 30. Referring to FIG. 5a, end 124 of anvil base 120 is inserted into turn nut 202. If desired, lock nut 130 is screwed onto anvil base 120. Driving anvil 110 is screwed onto anvil base 120. It should be noted that driving anvil 110 and lock nut 130 could be screwed onto anvil base 120 before or after anvil base 120 is inserted into turn nut 202. In either case, driving anvil 110 and lock nut 130 are positioned on anvil base 120 by rotation along the screw threads 128 so that the distance between the beveled end of driving anvil 110 and the threaded end 142 of mandrel 140 is somewhat greater than the length of the nut plate sleeve that is to be installed. It should be noted that driving anvil 110 is centered about mandrel 140, so that the longitudinal axes of mandrel 140, driving anvil 110, and anvil base 120 are substantially co-linear. The tool with attached anvil assembly 100 and a rivetless nut plate assembly 10 are aligned on opposite sides of a work piece 30 such that the central axes of driving anvil 110, mandrel 140, hole 32 in work piece 30, and nut plate 10 are all approximately aligned with each other. Nut plate assembly 10 may be held in position behind work piece 30 using a hand-held wrench or other tool (not shown).

Figure 5B:
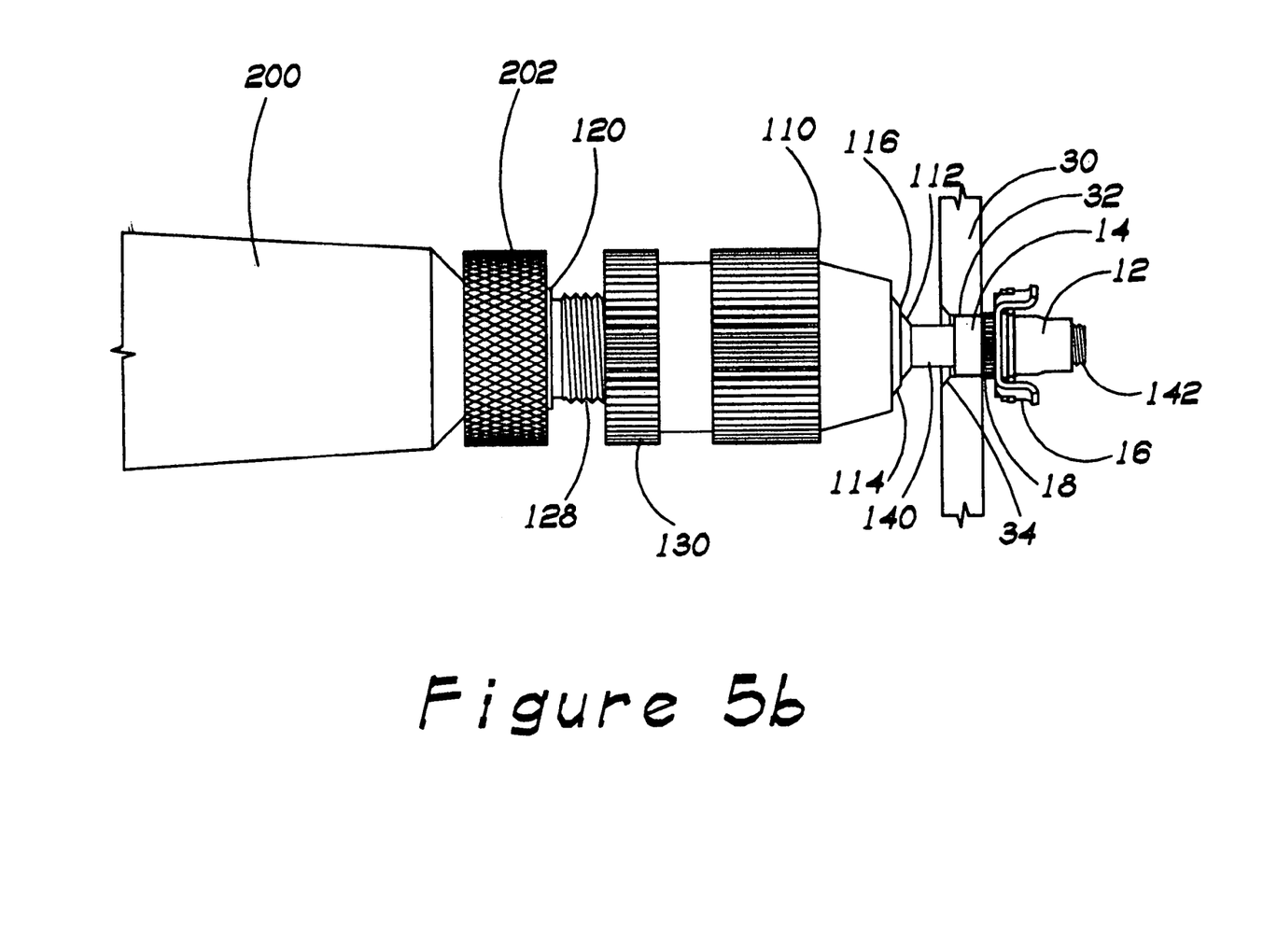

As shown in FIG. 5b, the threaded mandrel 140 is then rotated using turn nut 202 to engage the threaded end 142 with the internal threads of nut 12, and sleeve 14 of nut plate assembly 10 is positioned inside countersunk hole 32 in the work piece. It should be noted that the engaged portions of mandrel end 142 and nut 12 should be sufficiently long that the two parts will be able to withstand the pulling forces to be applied. Driving anvil 110 is then positioned so that positioning portion 114 is close to countersink 34, and flaring portion 112 is close to open end 20 of sleeve 14. If desired, lock nut 30 is rotated until it contacts the base portion 102 of driving anvil 110. It is particularly desirable to use lock nut 130 when multiple identical nut plates are to be installed, so that the position of driving anvil 110 need not be readjusted prior to installing each nut plate.

Figure 5C:
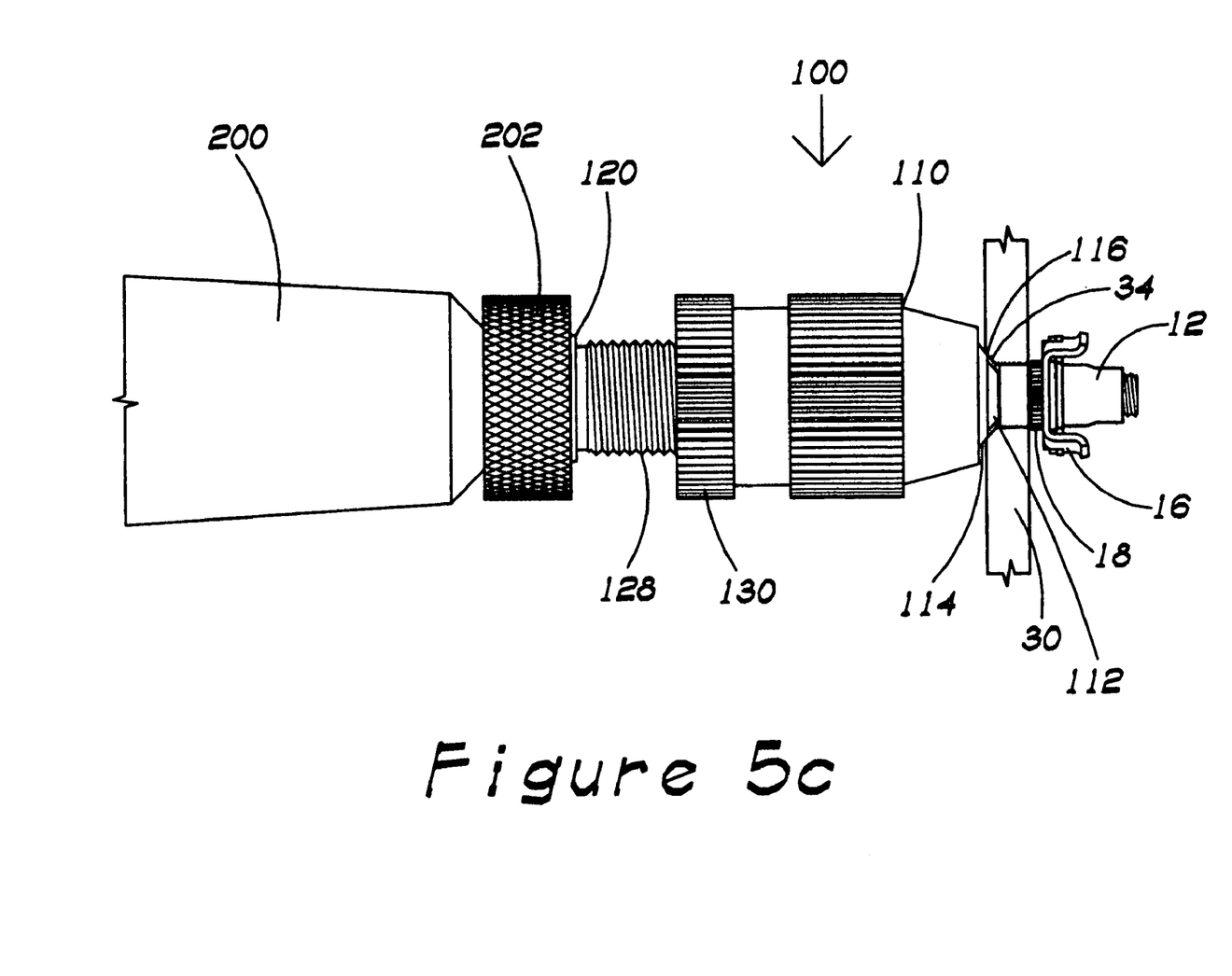
Figure 5D:
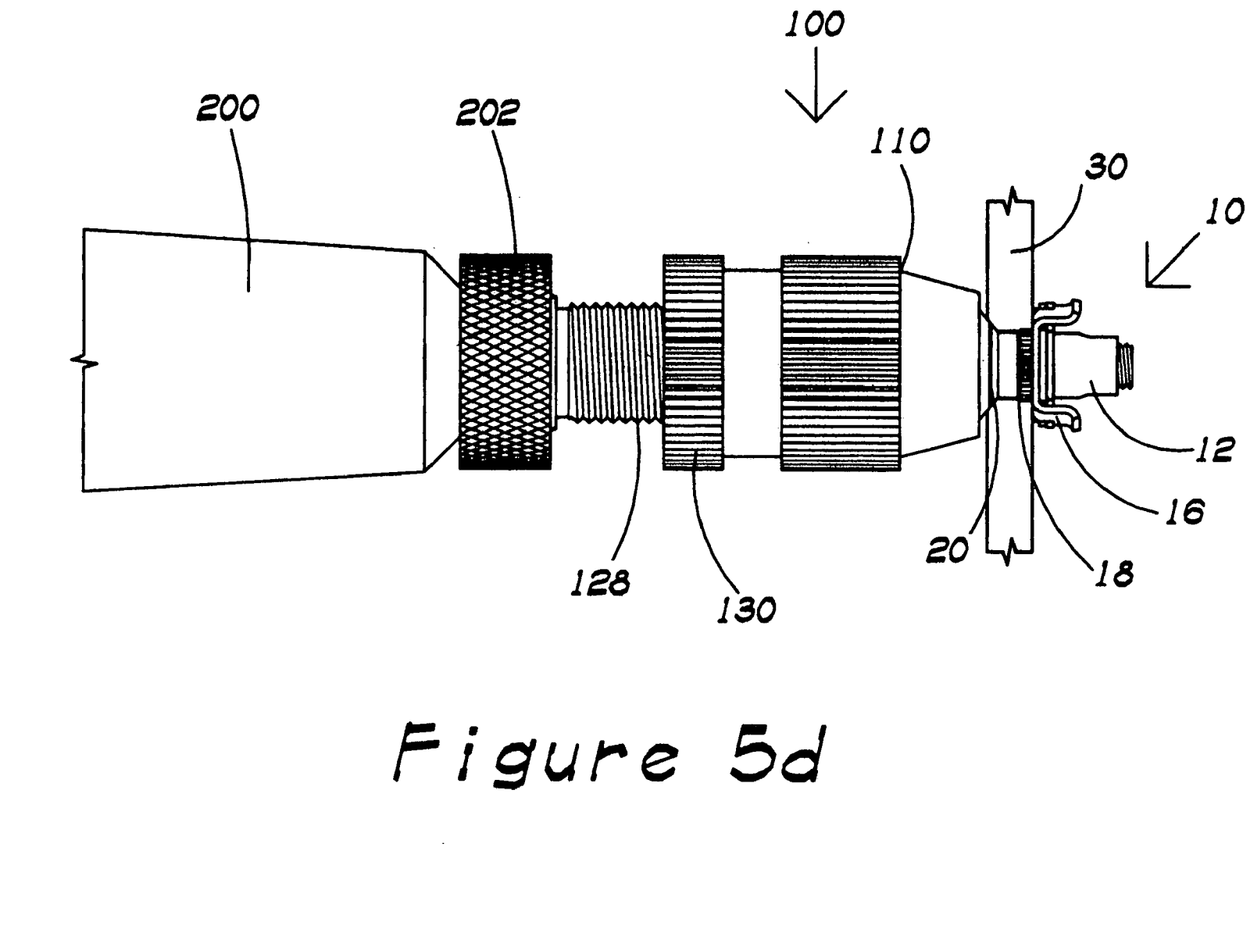

Referring to FIG. 5c, the tool is then activated so that nose tube 200, turn nut 202, and anvil assembly 100 are advanced as a unit along mandrel 140, until positioning portion 114 is centered inside countersink 34. As the distance between driving anvil 110 and nut plate 10 decreases, the flaring portion 112 of driving anvil 10 butts against and into the open end of sleeve 14. Thus, sleeve 14 is centered within hole 32 and also about the end of driving anvil 110. As the driving anvil 110 is pushed further toward the work piece 30 and nut plate 10, mandrel 140 pulls nut plate 10 toward the tool. Splined portion 18 of nut plate sleeve 14 is pulled into hole 32, and the splines contact the inside surface of the hole 32 while the open end 20 of sleeve 14 is flared outward between sleeve flaring portion 112 of anvil 110 and the countersink 34. During this process, the sleeve, the anvil, and the mandrel remain concentric. The splined end 18 of sleeve 14 is pulled into hole 32 substantially simultaneously with flaring of open sleeve end 20, and at the same time sleeve 14 remains centered in hole 32. Preferably, the installation tool uses hydraulic pressure to aid in applying the required pulling and pushing forces to install nut plate 10. FIG. 5d shows the combination of the nose tube 200, turn nut 202, anvil driving assembly 100, workpiece 30, and nut plate assembly 10 after installation into the workpiece.

Figure 5E:
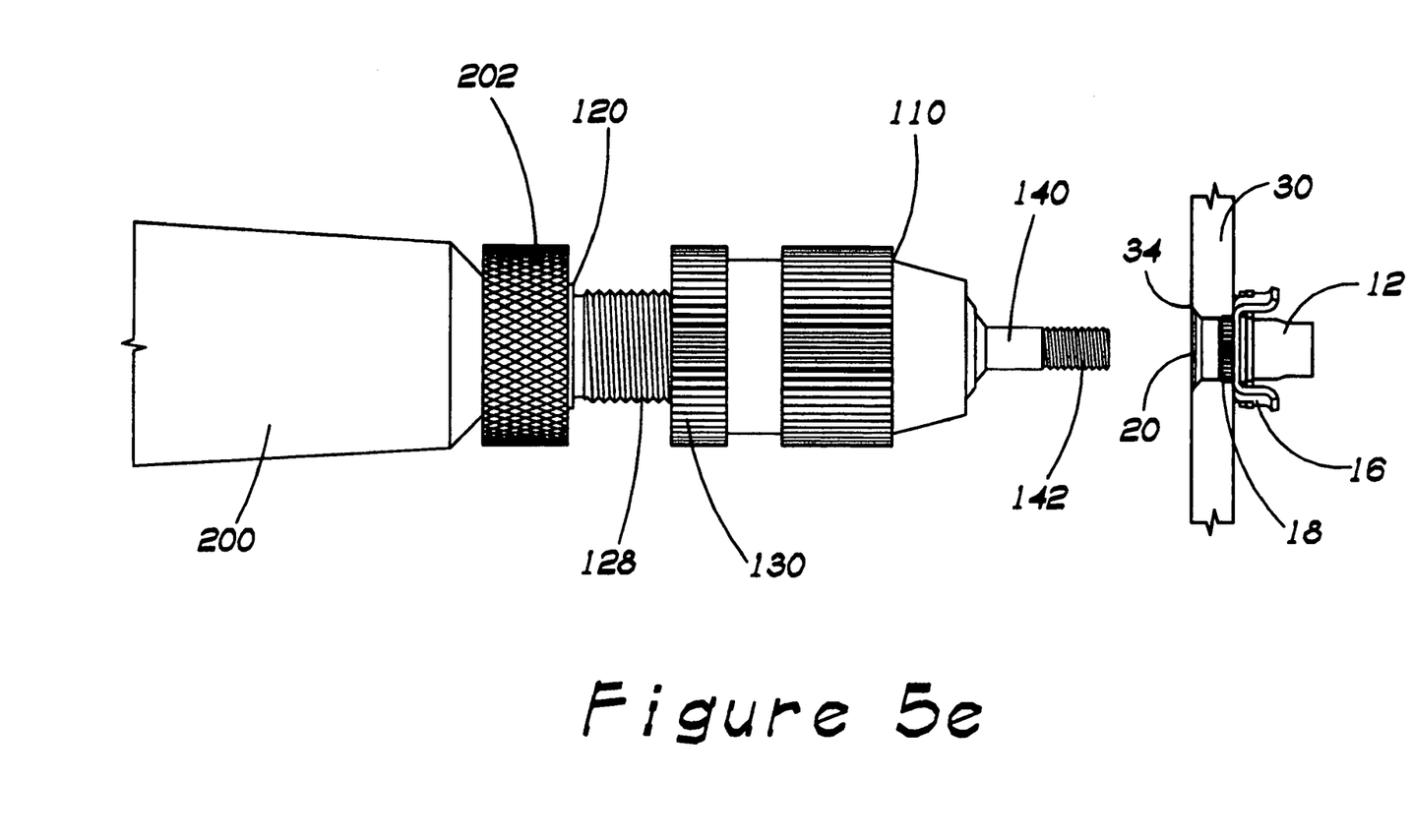

After the nut plate 10 is installed into work piece 30, the forces that have been applied to the nut plate 10 via the threaded end 142 of the mandrel 140 and the driving anvil 110 are released, such as by relieving the hydraulic pressure in the installation tool. Turn nut 202 is rotated to unscrew mandrel end 142 from nut 12, and the tool and anvil driving assembly are moved away from the workpiece 30 and the installed nut plate 10, as shown in FIG. 5e. The wrench or other tool used to hold the nut plate 10 in place from behind the workpiece 30 is also removed to complete the installation process.

Figure 6:
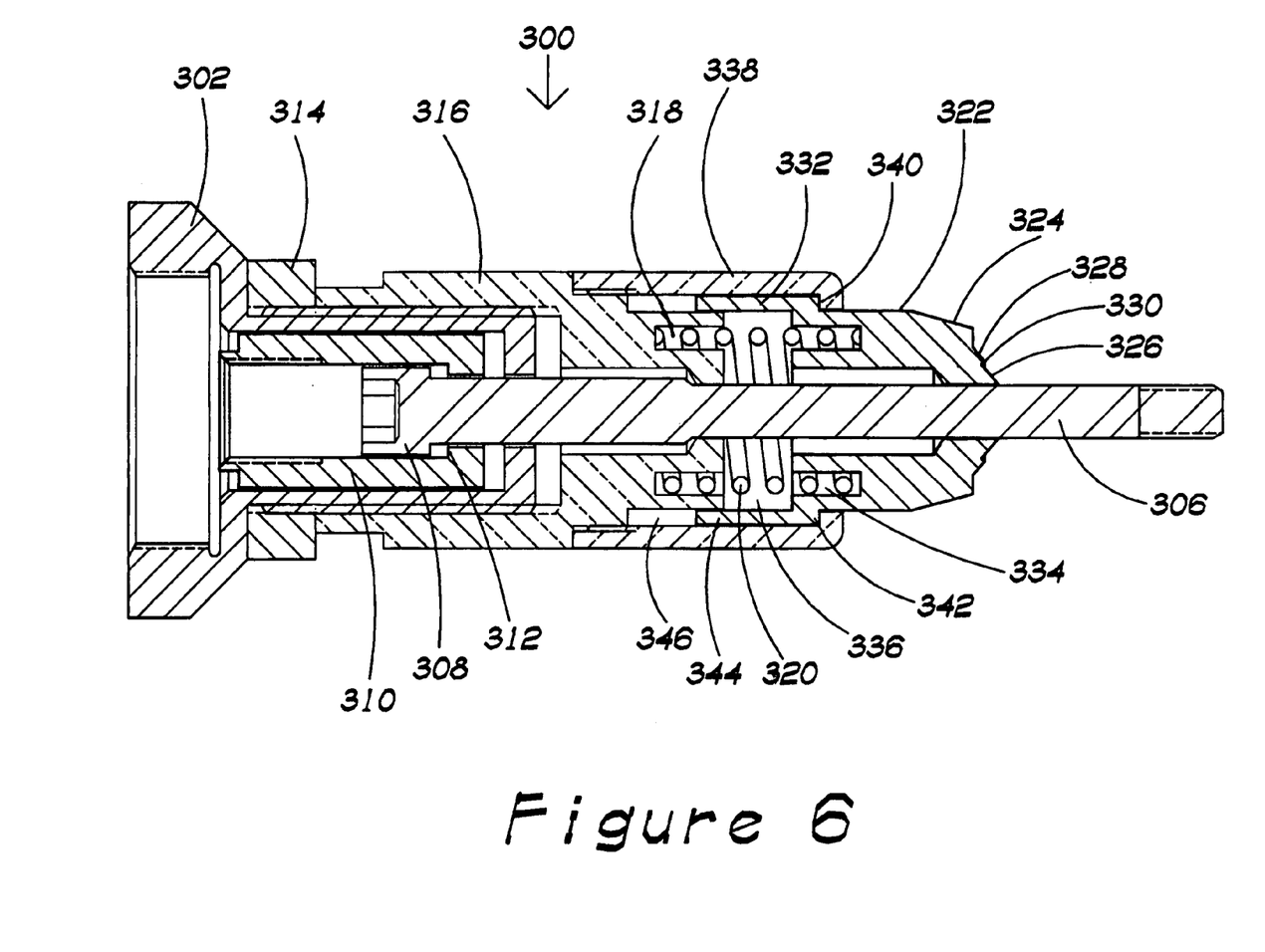
FIG. 6 is a cross section of another embodiment of a driving anvil assemblyl in accordance with the present invention.

Another embodiment of the driving anvil assembly of the present invention, suited for use with an automatic pneumatic, hydraulic, or pneumatic-hydraulic driving tool, is shown in FIG. 6 as 300. Anvil base 302 mounts onto the end of a driving tool (not shown), surrounding and concentric with mandrel 306, which is also mounted onto the driving tool in a manner that allows mandrel 306 to rotate independently of driving anvil assembly 300. Mandrel 306 includes a flanged head 308 near the end that is attached to the driving tool. Mandrel puller 310 is positioned between mandrel 306 within the interior space in anvil base 302, and mandrel puller 310 includes a flange 312 sized for engagement with flanged head 308 of mandrel 306. Lock nut 314 and anvil carrier 316 are internally threaded for engagement with external threads of anvil base 302. Driving anvil carrier 316 includes an annular slot 318 sized to accommodate one end of spring 320. Driving anvil 322 has a driving end 324 with a beveled sleeve-flaring portion 326 and a beveled positioning portion 328, separated by a stepped shoulder 330, similar to the anvil assembly shown in FIGS. 3–5. Base portion 332 of the driving anvil 322 includes an annular slot 334 sized to accommodate the other end of a spring 320. Spring 320 is long enough and stiff enough to maintain a gap 336 between carrier 316 and driving anvil 322. Driving anvil cap 338 is secured to driving anvil carrier 316 by means of screw threads, and flange 340 is formed in a manner that is suitable for engagement with shoulder 342 of driving anvil 322. The annular base 344 of driving anvil 322 is sized such that it can slide easily within annular space 346 between anvil carrier 316 and anvil cap 338. For proper operation of the driving anvil assembly, mandrel 306 should be long enough to extend from the driving tool through anvil base 302, lock nut 314, anvil cap 338, and anvil 322, and also through a work piece to engage an internally threaded nut of a rivetless floating nut plate on the far side of the work piece.

In use, the driving anvil assembly 300, mounted on the installation tool, is first centered on the countersink of a hole in a work piece while the mandrel 306 is spinning. When the operator is ready to install a rivetless nut plate into the work piece, he or she pushes the tool toward the work piece, thus fully engaging the threaded end of the mandrel 306 with the internal threads of the fastener nut, which is being held in place on the opposite side of the work piece by the operator. Mandrel puller 310 is then pulled toward the installation tool, preferably hydraulically, and engages flanged head 308 of mandrel 306, so that the fastener is then pulled into the work piece. Thus, mandrel 306 slides within the internal openings in the various parts of the anvil assembly 300, the open end of the nut plate sleeve is pulled against the driving anvil 322, and driving anvil 322 is pulled toward anvil carrier 316 as spring 320 is compressed. The mandrel 306 is then spun out of the nut by the driving tool, leaving the fastener installed in the work piece, and spring 320 restores driving anvil 322 to its original position. In a preferred embodiment, a pneumatic mechanism spins the mandrel 306, and a hydraulic mechanism provides sufficient pressure to pull the mandrel 306 and attached fastener toward the driving tool. The tool may include a hydraulic pressure release mechanism that releases when a preset pressure is obtained and triggers the mandrel 306 to spin out of the fastener nut. Using this type of driving anvil assembly and installation tool, installation of a rivetless nut plate takes about 2 to 2.5 seconds.

The foregoing description is considered as illustrative only of the principles of the invention. Further, since numerous modifications and changes will readily occur to those skilled in the art, it is not desired to limit the invention to the exact construction and process shown as described above. Accordingly, all suitable modifications and equivalents may be resorted to falling within the scope of the invention.

I claim:

1. A driving anvil assembly for installing rivetless floating nut plates, said anvil assembly comprising:
   a driving anvil comprising an internally threaded base portion and an annular tapering driving portion, wherein said driving portion includes a beveled positioning portion and a beveled sleeve-flaring driving portion separated by a stepped shoulder portion, and wherein said driving anvil includes a longitudinal hole extending therethrough that is sized to accommodate a mandrel; and
   an anvil base comprising a first end adapted to be secured to an anvil driving tool, an externally threaded second end engageable with said internally threaded base portion of said driving anvil, wherein said anvil base includes a longitudinal hole therethrough sized to accommodate the mandrel;
   wherein said externally threaded second end of said anvil base is longer than said internally threaded base portion of said driving anvil.

2. The anvil driving assembly of claim 1, wherein said beveled positioning portion of said driving anvil is shaped to fit precisely and self-center into a predetermined countersink of a hole in a work piece, and said stepped shoulder portion is positioned between said beveled positioning portion and said sleeve-flaring portions for engagement with an end of a sleeve of a rivetless floating nut plate having a pre-determined inner diameter to center the sleeve about a central longitudinal axis of said driving anvil.

3. The anvil driving assembly of claim 1, further comprising an internally threaded lock nut engaged with said externally threaded end of said anvil base, and wherein said threaded end of said anvil base is longer than the combined lengths of said internally threaded portion of said driving anvil and said lock nut.

4. The anvil driving assembly of claim 3, wherein at least one of said lock nut and said base portion comprises a knurled exterior surface.

5. The anvil driving assembly of claim 3, wherein each of said lock nut and said base portion have exterior knurled surfaces have different knurl patterns that are distinguishable by touch.

6. The anvil driving assembly of claim 1, wherein said first end of said anvil base is adapted for a friction fit or a threaded fit within an opening in an anvil driving tool.

7. A tool for installing rivetless nut plates, the tool comprising:
- a nose tube and turn nut adapted to receive an anvil base;
- a mandrel fixedly attached to said tool and extending outward from said tool; and
- a driving anvil assembly including an anvil base adapted for reception and retention within said nose tube and turn nut.

8. The tool of claim 7, wherein said driving anvil assembly comprises:
- a driving anvil comprising an internally threaded base portion and an annular tapering driving portion, wherein said driving portion includes a beveled positioning portion and a beveled sleeve-flaring driving portion separated by a stepped shoulder portion, and wherein said driving anvil includes a longitudinal hole extending therethrough that is sized to accommodate a mandrel; and
- an anvil base comprising a first end adapted to be secured to an anvil driving tool, an externally threaded second end engageable with said internally threaded base portion of said driving anvil, wherein said anvil base includes a longitudinal hole therethrough sized to accommodate the mandrel;
- wherein said externally threaded second end of said anvil base is longer than said internally threaded base portion of said driving anvil.

9. The tool of claim 8, additionally comprising an internally threaded lock nut engageable with said externally threaded end of said anvil base between first end and said driving anvil, and wherein said threaded end of said anvil base is longer than the combined lengths of said internally threaded portion of said driving anvil and said lock nut.

10. The tool of claim 7, wherein said tool is a hand-held tool comprising a hydraulic system for pulling said mandrel and pushing said driving anvil assembly.

11. The tool of claim 7, where in said tool comprises a pneumatic system for rotating said mandrel and a hydraulic system for pulling said mandrel and pushing said driving anvil assembly.

12. A driving anvil for installing rivetless floating nut plates, said anvil comprising:
- an internally threaded base portion;
- an annular tapering driving portion, wherein said driving portion includes a beveled positioning portion, a beveled sleeve-flaring driving portion, and a stepped shoulder portion separating said positioning and sleeve-flaring portions, and wherein said driving anvil includes a longitudinal hole extending therethrough that is sized to accommodate a mandrel.

13. A method for installing rivetless floating nut plates into a work piece, the method comprising the steps of:
- (a) providing a work piece comprising a first side and a second side and having a hole therethrough with a beveled countersink on said first side of said work piece;
- (b) inserting a sleeve of a rivetless floating nut plate through the hole from the second side of the work piece so that a basket, a nut, and a splined end of the sleeve are located on the second side of the work piece and an open end of the nut plate sleeve is located near the first side of the work piece;
- (c) inserting a mandrel through the sleeve from countersunk side of work piece and engaging an externally threaded end of the mandrel with the internally threaded nut of the nut plate;
- (d) moving an anvil centered on the mandrel on the first side of the work piece along the mandrel toward the work piece until a beveled portion of the anvil, concentric with the mandrel, makes contact with the beveled countersink of the hole in the work piece and an annular flaring portion of the anvil makes contact with the open end of the nut plate sleeve, thereby centering the beveled end of the anvil and the nut plate sleeve in the countersunk portion of the hole; and
- (e) driving the beveled end of the anvil into the hole while simultaneously pulling the mandrel in the opposite direction, thereby substantially simultaneously seating the splined end of the nut plate sleeve in the hole and flaring the open end of the sleeve against the beveled countersink of the hole.

14. The method of claim 13, further comprising the step of releasing pressure on said anvil and disengaging the mandrel from the nut plate.

15. The method of claim 13, further comprising the step of positioning a lock nut against a non-beveled portion of the anvil to maintain position of anvil.

16. The method of claim 13, wherein said anvil includes an internally threaded portion engaged with an externally threaded anvil base, and step (d) comprises moving said anvil along said anvil base by rotating it for travel along the threaded base.

17. The method of claim 13, wherein the rivetless floating nut plate has a sleeve length selected to match the thickness of the work piece and an outer diameter selected to match the diameter of the hole through the work piece.

\* \* \* \* \*